Patented Dec. 2, 1947

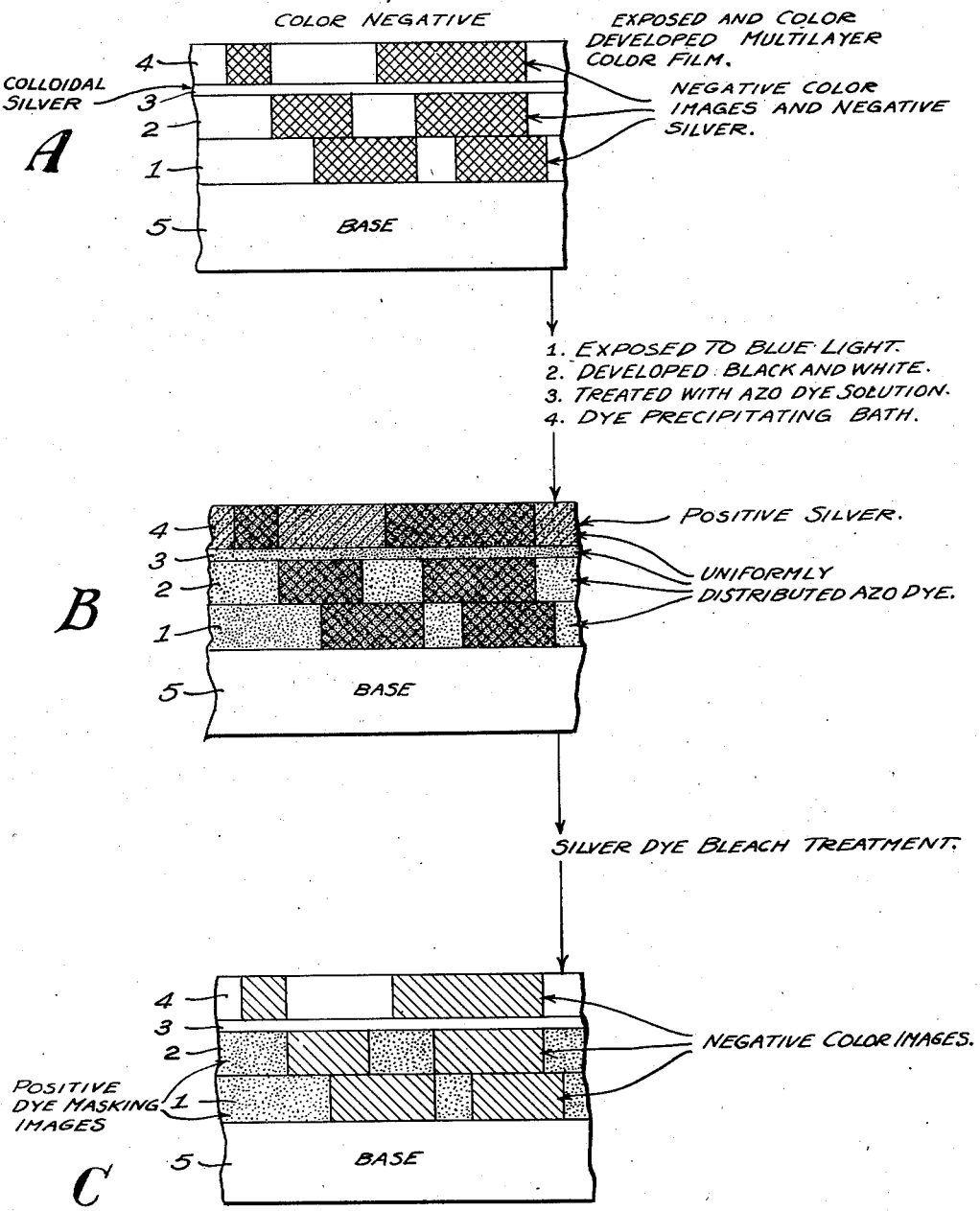

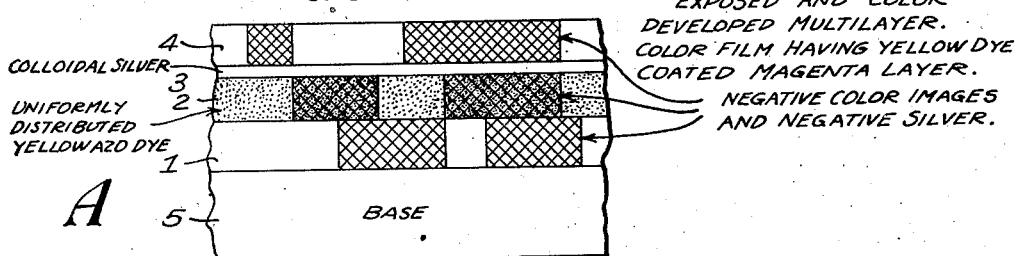
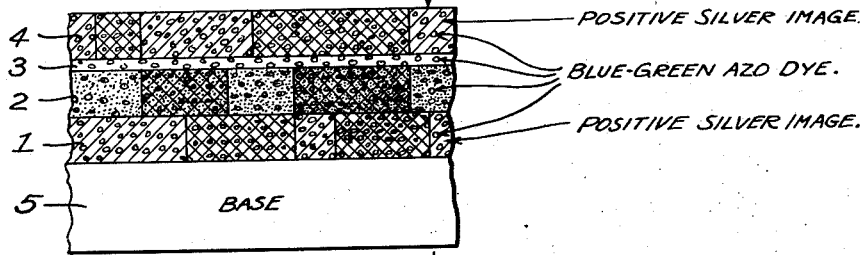
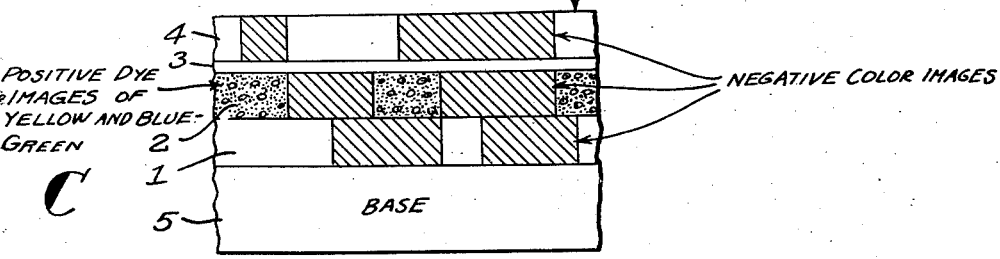

2,431,996

UNITED STATES PATENT OFFICE 2,431,996

PRODUCTION OF COLOR NEGATIVE FILM CONTAINING INTEGRAL MASKING IMAGES FOR COLOR CORRECTION

Herman H. Duerr, Herbert W. Morreall, Jr., and Harold C. Harsh, Binghamton, N. Y., assignors to General Aniline & Film Corporation, New York, N. Y., a corporation of Delaware Application May 3, 1944, Serial No. 533,834

6 Claims. (Cl. 95—2)

The present invention relates to color photography and particularly to color negatives containing integral masking images for color correction purposes, and to processes of producing said color negatives.

In the production of color prints or color transparencies from color negatives, the multilayer color negative consists of yellow, magenta and cyan images in three different layers: the cyan image represents the red, the magenta image the green and the yellow image the blue record of the original subject. Color positive prints or transparencies may be obtained from such color negatives by direct printing on a multilayer color positive film or paper or by making color separation negatives which are then used for the making of color positive prints.

It is known that the colors, pigments or inks which are used in color photography for forming the transparent dye images are not ideal in their absorption characteristics for allowing color reproductions which are perfectly true in their color hues. Various ways and means have been devised to correct for the imperfect absorption of the dyes which are used. Generally it has not been very difficult to find suitable yellow dyes or pigments which have acceptable absorption characteristics and, therefore, need no correction in color printing processes. The magenta dyes, however, especially those which are obtained by color-forming development, and the cyan dyes do not have these desirable absorption characteristics. The magenta dyes, pigments or inks usually have very undesirable absorption in the blue and in many cases incomplete absorption in the green region. The cyan dyes usually show a considerable absorption in the blue and green region. To compensate for these deficiencies in the absorption of the magenta and cyan dyes in color negatives, it is necessary to apply color correction or "masking methods" in order to obtain color prints with true tonal values.

One well known method of obtaining such color correction consists in making a weak positive from one color record and superimposing this positive mask with a complementary color record when printing from the later record. In this case an additional film and printing operation are necessary to provide the color correction mask. Furthermore, the problem of securing the proper registration of the two images makes this method complicated. It has also been proposed to incorporate in a multilayer film containing color-forming components a separate emulsion layer and to convert this separate layer by special and complicated processing steps into a masking layer.

In our co-pending application, Serial No. 464,716, now U. S. Patent 2,357,388, we have described a process wherein the difficulties and disadvantages attendant upon the use of known processes and known color negatives containing printing masses can be overcome by producing only in the cyan and magenta layers of negative subtractively color multilayer film reversed so-called "rest images" or stained images and utilizing these images as masks in printing to compensate for the incorrect color absorption of the cyan and magenta dyes. In our co-pending application, Serial No. 533,833, filed on even date herewith, we have described further processes whereby true dye images are produced in the cyan and magenta layers by incorporating azo dyes, capable of forming positive images upon bleaching out with a silver-dye bleach bath, in the cyan and magenta layers prior to exposure and development of the film or by treating an exposed and developed color negative with a yellow azo dye solution so as to deposit the dye in the cyan and magenta layers only; then bleaching out the so deposited yellow azo dye in situ with the negative silver and leaving positive dye images in those layers.

We have now found that another method for integral masking can be used for multilayer color negative films whereby colored positive images or masks are produced in any of the color layers other than the blue sensitive layer, for instance, in the red or green sensitive layers or, more specifically, the cyan and magenta color layers by means of a second exposure coupled with a dye solution aftertreatment. Different colored masking images in the cyan and magenta layers are possible by proper selection of the second exposure light and incorporation of one of the dyes in the cyan or magenta layer prior to exposure.

The invention will be more readily understood when read in connection with the accompanying drawings in which:

Figure I comprises sectional views of a multilayer color film treated in accordance with this masking process. Views A, B and C of Figure I illustrate the changes in the film during the various stages in the treatment as follows:

A illustrates a section of a multilayer color film which has been exposed and color developed but not fixed;

B illustrates the same multilayer color film after it has been re-exposed from the emulsion side with blue light, developed in a black and white developer and after-treated with an azo dye solution;

C illustrates the same multilayer color film after it has been treated with a silver-dye bleach bath.

Figure II comprises sectional views of a multilayer color film treated by a modified process to produce green masking images. Views A, B and C of Figure II illustrate the changes in the film during the various stages in the treatment as follows:

A illustrates a multilayer color film containing a yellow azo dye in one of the layers, which film has been exposed and developed to a color negative;

B illustrates the same multilayer color film which has been re-exposed with minus green light, developed in a black and white developer and after-treated with an azo dye bath;

C illustrates the same multilayer color film after it has been treated in a silver-dye bleach bath.

Referring to the drawings and particularly to Figure I—A, the multilayer film which has been exposed and color developed comprises a base 5, on which are superimposed three exposed and developed silver halide emulsion layers, one of which indicated by the numeral 1, the red-sensitive layer, contains cyan colored silver images; another of which indicated by the numeral 2, the green-sensitive layer, contains magenta colored silver images; and a third of which indicated by the numeral 4, the blue-sensitive layer, contains yellow colored silver images. Between the green-sensitive or so-called "magenta layer" 2 and the blue-sensitive or yellow layer 4, there is a gelatine filter layer 3, containing colloidal silver or a fogged emulsion containing a yellow azo dye which can be destroyed in the presence of silver in a dye-silver bleaching bath. Suitable yellow dyestuffs for use in this filter layer, which are preferably not affected by the color developing solution, are for instance Benzo Fast Yellow R. L. (By) #349a in Color Index of Society of Dyers and Colorists, 1st edition, 1924. Suitable colloidal silver filter layers are disclosed in U. S. P. 2,220,187.

The red sensitive layer 1, of the original film prior to exposure and color development contains a non-diffusing color coupling component capable of being developed to a cyan dye image with a color developer such as diethyl-p-phenylene-diamine. We have found that suitable cyan dye images may be produced from the color components disclosed in U. S. Patents 2,179,238, 2,186,733 and 2,224,329. Specific examples of such color components are, for instance, 3.5-di(phenylamino)phenol, abietyl-amino-naphthol, 1 - N - stearyl-4-N-(1-hydroxy-2'-naphthoyl)-phenylene-diamine sodium sulfonate and the like. Green-sensitive layer 2 of the original film contains a color coupling component capable of forming a magenta dye with a suitable color developer such as above. Satisfactory color components for the magenta image are the non-diffusing components described in U. S. Patents 2,178,612 and 2,179,238. Examples of such components are the condensation product of meta-amino-phenyl-methyl-pyrazolone and the mixed polymer of vinyl chloride and maleic acid anhydride, 1[myristyl amino 2-sulfo] phenyl-3-methyl-5-pyrazolone, and the like. The blue-sensitive layer 4 contains a color coupling component capable of forming a yellow dye image with a color developer as above. Satisfactory components for this layer are the non-diffusing yellow color components described in U. S. Patents 2,179,238 and 2,224,329, examples of which are terephthaloyl-bis-acetic acid anilide-p'-carboxylic acid, and the like.

The exposed and color developed film of Figure I—A contains cyan, magenta and yellow negative silver images in the layers 1, 2 and 4 respectively, as shown in Figure I—A. The film in this stage is exposed with blue light from the emulsion side and developed in a black and white developer which does not affect the color components in the yellow layer. A suitable black and white developer for this purpose is an amidol type developer, a typical formula of which is as follows:

| | |
|---|---|
| Sodium sulfite_____grams__ | 5 |
| Potassium metaborate_____do____ | 4.56 |
| Amidol (diamino phenol)_____do____ | 4.2 |
| Water to make_____cc__ | 1,000 |

This develops the remaining silver halide in the yellow layer to a silver image. Accordingly, this layer 4, now contains a yellow negative silver image resulting from the color negative development. In addition, the yellow layer 4 also contains a positive silver image resulting from the second exposure to blue light and the black and white development. This multilayer color negative film is then treated in a solution of yellow or red azo dye which is substantive to gelatine and contains groups so that it can be precipitated with precipitating agents such as calcium lactate and diphenyl-guanidine acetate or β-naphthyl - bi - guanide hydrochloride solution. The azo dyes which are used in this step must also be capable of being destroyed by a suitable bleach bath in the presence of silver, for instance, a solution of thiourea in acid. Examples of dyes suitable for this purpose are, for instance, the sodium salt of sulfo-β-naphthalene azo salicylic acid, the sodium salt of sulfanilic acid azo 1-o,m, dichlor - p - sulfophenyl-3-methyl-5-pyrazolone, Benzo Fast Yellow R. L. (By) #349a in Color Index of Society of Dyers and Colorists, 1st edition, 1924, Brilliant Red B (Schultz 423, 1931, 7th edition, volume I, Brilliant Purpurine 10B), Congo Red (Schultz 360, 1931, 7th edition, volume I), Cotton Red 4B (Schultz 448, 1931, 7th edition, volume I), and Direct Red (Schultz 439, 1931, 7th edition, volume I). The azo dye solution will uniformly color the three layers of the film as shown in Figure I—B wherein the yellow layer 4 is shown to contain a yellow negative color image, a negative silver image, a positive silver image and yellow dye throughout where the yellow azo dye solution has been used for the aftertreatment. The filter layer 3 is shown to contain the yellow azo dye throughout. The magenta and cyan layers, 2 and 1, respectively, are shown to contain magenta and cyan negative color images, negative silver images and yellow dye throughout the respective layers. After the treatment in the azo dye solution, the film is subjected to a short rinse by bathing it in a solution of a suitable dye-precipitant such as calcium lactate or diphenyl-guanidine acetate or β-naphthyl-biguanide hydrochloride. It is then washed with water and treated in a silver dye bleach bath which has no irreversible effect upon azo methine or quinone imine dyes produced by color development. Acid thiourea and potassium thio cyanate baths, of which the following are typical examples, have been found suitable for this purpose.

|  | I | II | III |
|---|---|---|---|
| Thiourea_____grams__ | 20 | 50 | _____ |
| KCNS_____do____ | _____ | _____ | 50 |
| HCl (conc.)_____cc____ | _____ | 10 | 60 |
| Citric acid_____grams__ | _____ | 25 | _____ |
| Water to make_____cc____ | 1,000 | 1,000 | 1,000 |

Similar silver dye bleach baths may be substituted which contain, in place of the thiourea or potassium thiocyanate, any nitrogen compound containing a thioketo group which is water soluble or can be water solubilized. Further examples of such compounds are: rhodanine, thiohydantoin, thiourazole, and thiotetrazoline. Any water soluble inorganic thiocyanate and thiourea dioxide may also be used.

The bleach bath will not affect the yellow color negative image in the top layer 4 but will completely destroy the uniformly distributed yellow azo bleach dye which is in contact with the uniformly distributed silver throughout the whole layer because this layer contains both negative and positive silver images. In the magenta and cyan layers the yellow dye is destroyed with the silver from the original color negative development and a yellow positive image of low contrast will remain in those layers serving as a masking image. Since the yellow dye in the filter layer 3 is also in contact with the uniformly distributed silver throughout the layer, it will also be destroyed in this layer. Figure III illustrates the final condition of the film after the silver and yellow dye in contact therewith have been bleached out as described above. Thus in Figure I—C layers 1, 2 and 4 are shown to have negative color images and layers 1 and 2, in addition, are shown to have positive dye images.

In one modification of this process it is desirable for good masking to produce a green masking image instead of yellow in the magenta layer and to effect this we have found it most desirable to have the masking image in this layer consist of two dyes which may be, for instance, Walk Yellow O (sodium salt of sulfo-β-naphthalene azo salicyclic acid) and Dianil Blue G (Schultz 504, 1931, 7th edition, volume I). In accordance with this modification, the color negative film is coated with a yellow azo dye uniformly distributed in the magenta layer. Figure II—A shows the yellow azo dye to be uniformly distributed in the magenta layer 2. This film, as illustrated in said Figure II—A, has been exposed and developed in a color developer which has formed color negative silver images in the cyan 1, magenta 2, and yellow 4 layers. The yellow azo dye also remains in the magenta layer 2. The film is now exposed uniformly with magenta or minus green light and developed in a black and white developer such as the Amidol developer described above. This second exposure produces a positive silver image in the cyan and yellow layers. The film is now treated in a dye solution of a suitable blue-green dye such as Dianil Blue G (Schultz #504, 1931, 7th edition, vol. I). This dyeing step is followed by bathing the film in a solution of a suitable precipitating agent such as described above.

As shown in Figure II—B, the blue-green azo dye is now contained in all of the layers including the filter layer 3. The condition of the film at this stage is as illustrated in Figure II—B wherein it will be seen that the cyan layer 1 and yellow layer 4 contain color negative silver images from the original exposure and color development, positive silver images from the second exposure and blue-green azo dye throughout. The magenta layer 2 contains color negative silver images from the original exposure and color development, yellow azo dye throughout from the original coating of this layer therewith and blue-green azo dye throughout from the above described dye bath treatment of the film after the second exposure and black and white development. The filter layer 3 contains the blue-green dye throughout. The film is now treated in a silver dye bleach bath as, for instance, an acid thiourea solution such as one of the above solutions and the uniformly distributed azo dyes in the different layers are destroyed as follows:

The blue-green azo dye in the yellow layer is completely destroyed because this layer contains both negative and positive silver images and therefore has silver more or less uniformly distributed throughout the layer in contact with the blue-green azo dye. In the yellow filter layer 3, which contains silver in uniform distribution, the blue-green dye is also completely destroyed by the silver dye bleach bath. The magenta layer 2 contains only the original negative silver and colored images from the first exposure and color development. The yellow and blue-green azo dyes in this layer are destroyed in those portions which contain the said negative silver leaving a green positive image, the density of which is controlled by the amount of yellow dye originally added to the emulsion and by the concentration of the blue-green dye bath in which the film has been treated after the second exposure and black and white development. The cyan layer 1 contains both positive and negative silver images and consequently the blue-green azo dye is completely destroyed in this layer because of the more or less uniform distribution of silver throughout the layer. This condition of the film after it has been treated with the silver dye bleach bath is illustrated in Figure II—C wherein the yellow layer 4 is shown to have only a color negative image. The magenta layer 2 contains a color negative image and a positive dye image of a mixture of yellow and blue-green dyes. The cyan layer 1 contains only the color negative image and the filter layer 3 contains no color.

In still another modification of this process it is desirable for good masking to produce a red masking image in the cyan layer. To accomplish this, the multilayer color film described above with reference to the drawings is color developed to a color negative. The so treated film is then exposed with minus red light and developed in a black and white developer such as the amidol type developer described above. It is then fixed in a regular fixing bath such as a 10% thiosulfate solution. The film is then treated in a 0.25% solution of Congo Red (Schultz 360, 1931, 7th edition, volume I) for approximately 5 minutes at a pH of from 5 to 6. The above red azo dye uniformly colors the four layers, including the yellow filter layer containing a colloidal silver. All of the layers except the red sensitive cyan layer now contain a negative and positive silver image while the filter layer contains colloidal silver. At this stage the film is washed with water and treated in a dye silver bleach bath such as the acid thiourea solution described above. This thiourea dye bleaching bath will remove the Congo red completely from all layers except the cyan layer. In the case of the cyan layer the red dye is removed only in situ with the negative silver leaving a positive red masking image.

It is possible to produce gray masking images in the cyan and/or magenta layers by this method when using a combination of azo dyes. In this case either a combination of suitable azo dyes which will produce black or a suitable black azo dye such as Diazine Black H (Schultz 393, vol. 1, 1931, 7th edition) or Buffalo Black A. D. (Schultz 599, 1931, 7th edition, volume I) is used for the bathing. To obtain a gray masking image in the cyan and magenta layers, the following procedure is employed:

After exposure and negative color development, the multilayer film is diffusely exposed from the emulsion side with blue light and developed in a black and white developer such as the Amidol developer described above. The film is then treated in a solution of Buffalo Black A. D. which will color all the layers uniformly gray. After a short rinse it is then treated with a dye precipitating solution such as a calcium lactate, diphenylguanidine-acetate or $\beta$-naphthyl-biguanide hydrochloride solution. The film is then subjected to the acid thiourea bleaching bath as described above which will destroy the black azo dye wherever it is in contact with silver. Accordingly, the black azo dye is completely bleached out in the top layer 4 and in the filter layer 3 containing colloidal or developed silver as the case may be. In the magenta 2 and cyan 1 layers the black dye is only removed in situ with the negative silver and gray positive masking image remains in these two layers with the negative color images.

Various other modifications of this invention will occur to persons skilled in the art and it is therefore understood that we do not intend to be limited in the patent granted except as required by the claims.

We claim:

1. In the production of subtractively colored negatives with correction printing masks from multilayer film having differently sensitized silver halide emulsions sensitized respectively to the blue, green and red regions of the spectrum, one layer being capable of producing a yellow negative image, another a magenta negative image and still another a cyan negative image upon being exposed to a colored subject, and color developed, and having a yellow filter layer between the magenta and yellow layers containing colloidal silver, the improvement which comprises exposing such a film and color developing it to said color images re-exposing the residual silver halide of at least one but not all such layers, the silver halide of the yellow layer being always re-exposed, developing the re-exposed layers in a black and white developer, incorporating into the several layers of the film an azo dye capable of being bleached in the presence of silver and having a color different from that of the unre-exposed layers, and treating the film with a silver-dye-bleach bath which does not irreversibly affect the dyes produced by color development.

2. In the production of subtractively colored negatives with correction printing masks from multilayer film having differently sensitized silver halide emulsions sensitized respectively to the blue, green and red regions of the spectrum, one layer being capable of producing a yellow negative image, another a magenta negative image and still another a cyan negative image upon being exposed to a colored subject, and color developed, having a yellow filter layer between the magenta and yellow layers, the improvement which comprises incorporating a member of the group consisting of substantive azo dyes, dyes which can be insolubilized, and dyes which can be rendered non-diffusing by precipitation, into the emulsion forming the magenta layer, exposing such a film and color developing it to said color images re-exposing the residual silver halide of at least one but not all such layers, the silver halide of the yellow layer being always re-exposed, developing the re-exposed layers in a black and white developer, incorporating into the several layers of the film an azo dye capable of being bleached in the presence of silver and having a color different from that of the unre-exposed layers, and treating the film with a silver-dye-bleach bath which does not irreversibly affect the dyes produced by color development.

3. In the production of subtractively colored negatives with correction printing masks from multilayer film having differently sensitized silver halide emulsions sensitized respectively to the blue, green and red regions of the spectrum, one layer being capable of producing a yellow negative image, another a magenta negative image and still another a cyan negative image upon being exposed to a colored subject, and color developed and having a yellow filter layer between the magenta and yellow layers, the improvement which comprises incorporating a non-diffusing yellow azo dye into the emulsion forming the magenta layer, exposing such a film and color developing it to said color images re-exposing the residual silver halide of a color negative thus produced to minus green light, developing the re-exposed film in a black and white developer, precipitating into the several layers of the film a cyan azo dye capable of being bleached in the presence of silver and treating the film with a silver-dye-bleach bath which does not irreversibly affect the dyes produced by color development.

4. In the production of subtractively colored negatives with correction printing masks from multilayer film having differently sensitized silver halide emulsions sensitized respectively to the blue, green and red regions of the spectrum, one layer being capable of producing a yellow negative image, another a magenta negative image and still another a cyan negative image upon being exposed to a colored subject, and color developed and having a yellow filter layer between the magenta and yellow layers, the improvement which comprises incorporating a non-diffusing red azo dye into the emulsion forming the cyan layer, exposing such a film and color developing it to said color images re-exposing the residual silver halide of a color negative thus produced to blue light from the emulsion side, developing the re-exposed film in a black and white developer, precipitating into the several layers of the film a yellow azo dye capable of being bleached in the presence of silver and treating the film with a silver dye bleach bath which does not irreversibly affect the dyes produced by color development.

5. In the production of subtractively colored negatives with correction printing masks from multilayer film having differently sensitized silver halide emulsions sensitized respectively to the blue, green and red regions of the spectrum, one layer being capable of producing a yellow negative image, another a magenta negative image and still another a cyan negative image upon being exposed to a colored subject, and color developed and having a yellow filter layer between the magenta and yellow layers, the improvement which comprises exposing such a film and color developing it to said color images re-exposing the residual silver halide of a color negative thus produced to blue light from the emulsion side, developing the re-exposed film, in a black and white developer, precipitating into the several layers of the film an azo dye selected from the group consisting of yellow, red and black azo dyes, said azo dyes being capable of being bleached in the presence of silver, and treating the film with a silver dye bleach bath which does not irreversibly affect the dyes produced by color development.

6. In the method of producing printing masks in a multi-layer subtractively colored negative, one layer of which contains negative silver and yellow dye images, another of which contains negative silver and magenta dye images and a third of which contains negative silver and cyan dye images and all of said image containing layers containing complementary residual silver halide positive images, the layers containing said yellow and magenta images being separated by a colored filter layer, and said dye images being constituted by dyes selected from the class consisting of azo methine and quinone amine dyes, the improvement which comprises exposing the residual silver halide of at least one but not all of the layers, the residual silver halide of the yellow layer always being so exposed, developing the so exposed latent positive images in a black and white developer, treating the negative with an azo dye having a color different from that of the layers which have not been re-exposed and redeveloped and subjecting the negative to a silver-dye bleaching bath incapable of destroying the azo methine and quinone amine dyes, to thereby destroy the azo dyes in contact with the negative and positive silver images.

HERMAN H. DUERR.
HERBERT W. MORREALL, JR.
HAROLD C. HARSH.

REFERENCES CITED

The following references are of record in the file of this patent:

UNITED STATES PATENTS

| Number | Name | Date |
| --- | --- | --- |
| 2,203,656 | MacAdam et al. | June 4, 1940 |
| 2,193,931 | Michaelis | Mar. 19, 1940 |
| 2,340,656 | Gaspar | Feb. 1, 1944 |
| 2,221,025 | MacAdam et al. | Nov. 12, 1940 |
| 1,229,546 | Thornton | June 12, 1917 |
| 1,308,538 | Brewster | July 1, 1919 |